United States Patent [19]
Knuth

[11] 3,930,328
[45] Jan. 6, 1976

[54] ANCHOR AND ADJUSTABLE TIE-LINE FOR FLOATABLE DECOYS

[76] Inventor: Eugene W. Knuth, Land O'Lakes, Wis. 54540

[22] Filed: July 16, 1973

[21] Appl. No.: 379,830

[52] U.S. Cl. .................................................. 43/3
[51] Int. Cl.² ...................................... A01M 31/06
[58] Field of Search ........ 43/3, 2; 24/115 H, 129 D, 24/136 R

[56] References Cited
UNITED STATES PATENTS

| | | | |
|---|---|---|---|
| 1,887,491 | 11/1932 | Johnson | 24/129 D |
| 2,630,093 | 3/1953 | Toal | 43/3 X |
| 2,636,237 | 4/1953 | Price | 24/129 D |
| 2,704,961 | 3/1955 | Weil | 24/129 D |
| 2,747,315 | 5/1956 | Clemas | 43/3 |
| 3,149,433 | 9/1964 | Hagen | 43/3 |

Primary Examiner—Russell R. Kinsey
Assistant Examiner—J. Q. Lever
Attorney, Agent, or Firm—Edwin E. Greigg

[57] ABSTRACT

An anchor and a slidably adjustably carried tie-line for a floatable decoy duck or the like comprising a generally elongated non-rustable metal body preferably wider at one end than at the other, a continuous passageway for said tie-line extending from and returning to one end of and partially through said body, said passageway having an open side for at least a portion of its length, an elastic member carried by said body and overlying the open side of said passageway and forcibly engaging said tie-line, whereby to resist free travel of said tie-line so that the required useable length of said tie-line beyond said anchor may be desirably determined for anchoring the decoy for limited movement when floating and for unit storage with said tie-line under tension on said decoy ready for re-use.

4 Claims, 5 Drawing Figures

U.S. Patent  Jan. 6, 1976  3,930,328
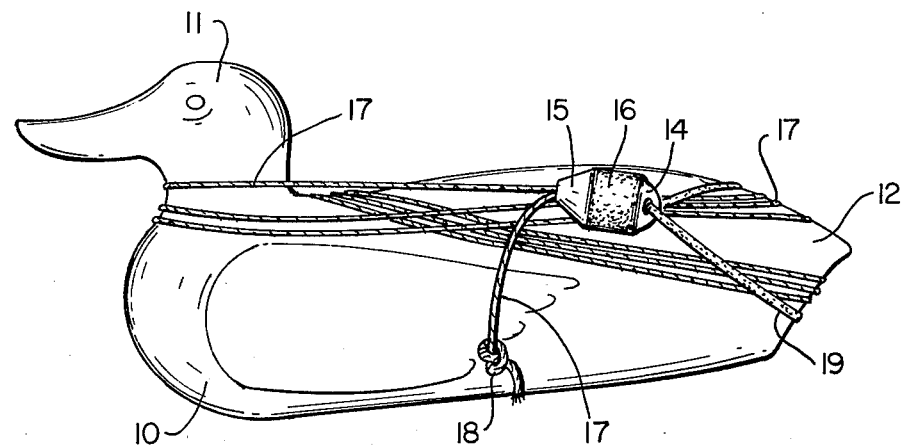
FIG. 1
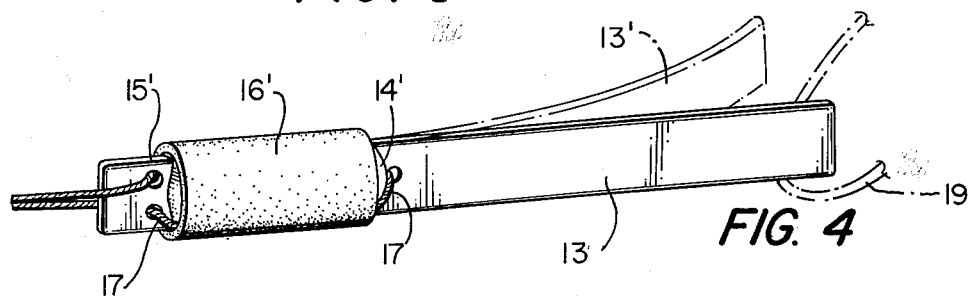
FIG. 4
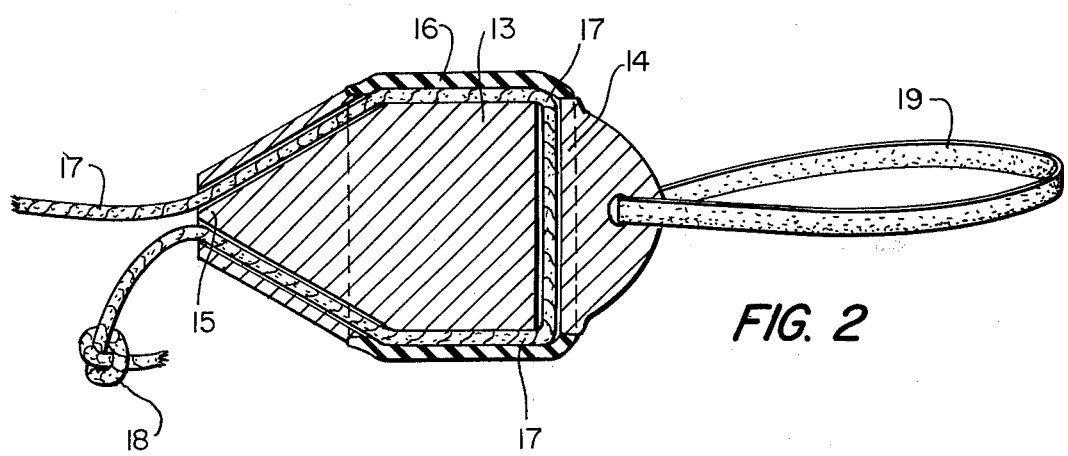
FIG. 2
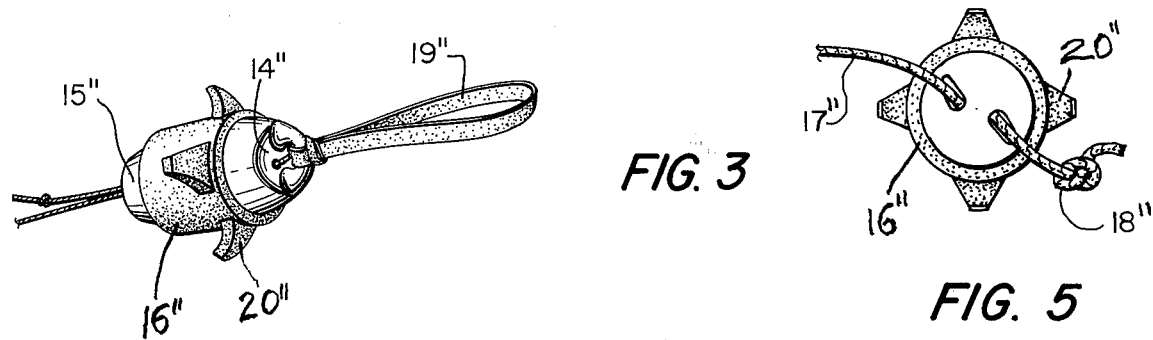
FIG. 3
FIG. 5

ANCHOR AND ADJUSTABLE TIE-LINE FOR FLOATABLE DECOYS

This invention as shown and hereafter claimed relates to important improvements and relationship in the anchor and its tie-line from a decoy duck or other floatable decoy whereby the tie-line connection to the anchor may be easily and positively adjusted as required, without requiring separation.

An object of the instant invention is to provide an anchor for a flotable decoy having a tie-line attached thereto at one end, said anchor being adjustably connected to said tie-line for ready and ease of operation depending upon the depth of the water encountered in use and also for unit storage of said decoy, tie-line and anchor after use.

Another object of my invention lies in the means on said anchor which provides a predetermined slidably frictional connection between an open sided passageway on said anchor and the tie-line from said decoy.

A still further object of my invention lies in the combination of means, whereby quick and easy manipulation of said anchor and tie-line may be relied upon to effect required adjustment of the length of said tie-line between said anchor and decoy.

Other objects and advantages of my improved anchor for adjustable tie-line connection with a flotable decoy for both storage of the decoy and flotable uses thereof may be more fully appreciated and understood by reference to the accompanying drawing, wherein:

FIG. 1 is an imaginary side view of a decoy duck on which the tie-line and anchor are compactly lashed under tension on the decoy as a unit for storage;

FIG. 2 is a transverse section through the anchor of FIG. 1 showing the adjustable tie-line from the decoy in full lines and its relation to the open sided passageway covered by the surrounding rubber band-like jacket;

FIG. 3 is a side prespective view of a modified form of anchor whereby a change in body shape is provided;

FIG. 4 is another modified form of decoy anchor which also embodies the salient features of my invention as in FIG. 3; and FIG. 5 is an end view showing the points of entering and leaving of the tie-line to and from one end of the anchor of the modified form of anchor of FIG. 3.

It is equally important that the hunter on collecting the equipment for a successful hunting trip that all items necessary to that end be quickly and readily found and in good useable condition, it is just as important that on the completion of such a trip all such items as decoys, their tie-lines and anchors be handled as one unit to save time and space in storage and for reuse as intended. To the ends above stated the anchor shape having a body formed of a selected weighty material usually a non-rusting metal such as lead, shown in FIGS. 1 and 2 as generally pear shaped to provide one end 14 larger than the other 15 but not necessarily so and having a continuous looped passageway entering one end of the anchor and returning to that same end with the outer sides of said passageway adjacent the larger end of the anchor open to receive the braking force of the overlying elastic band 16 on the tie line 17 from the decoy to which it is permanently attached at one end. Adjustment of the tie-line between the decoy and its weight anchor is thus effectively produced as desired by merely pulling on the knotted free end 18 of the tie-line 17 with sufficient force to overcome the braking action exerted on the tie-line 17 by the band 16 to effect such movement of the tie-line through the looped passageway in the anchor as to reduce the length of the tie-line between the decoy and its anchor. Obviously a pull of similar force on the adjacent end portion of the line from the anchor will produce the opposite effect. As shown in FIG. 1 where the tie-line is used to lash down the anchor and itself upon the back of the decoy for storage or its next use, these parts may be safely secured under tension by winding the tie-line back and forth over the back of each decoy between the head end or neck 11 and the rear end or tail 12 as shown in FIG. 1 with anchor finally fastened down also by looping the rubber band 19 over the tail of the decoy and the previously laid lengths of tie-line 17 and finally tensioning the entire assembly by exerting a pulling force on the tie-line 17 from the notted free end 18.

The anchor elements of FIG. 3 and FIG. 4 function in like manner for adjustment of the tie-line. In FIG. 3 the tie-line tensioning jacket surrounding the metal body of the anchor 16'' has formed thereon a plurality of ground engaging projections 20'' and in FIG. 4 the elongated body 1 may be bent at any time by the user to accomplish more or less drag as weather and movement of the water may dictate.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A floatable decoy and anchor therefor, the combination comprising:
    a weight;
    a tie-line having one loop disposed over said weight;
    an elastic band tautly overlying said weight and said tie-line loop;
    said tie-line having two ends, both ends of which extend outwardly from said band;
    the first end of said tie-line terminating in a knot; and
    the second end of said tie-line being attached to said decoy.

2. The combination of claim 1 wherein a second band member is fashioned as a loop and attached to said weight-elastic band assemblage at a point.

3. The combination set forth in claim 1 wherein the weight-elastic band assemblage has a plurality of integral offstanding projections thereon.

4. The combination set forth in claim 2 wherein the weight-elastic band assemblage has a plurality of integral offstanding projections thereon.

* * * * *